(12) United States Patent
Dvir et al.

(10) Patent No.: US 7,705,880 B2
(45) Date of Patent: Apr. 27, 2010

(54) DEVICE, SYSTEM AND METHOD FOR ENCODING EMPLOYING REDUNDANCY AND SWITCHING CAPABILITIES

(75) Inventors: Igal Dvir, Raanana (IL); Mordechai Shabtai, Tenafly, NJ (US); Erez Izchaki, Tel Mond (IL)

(73) Assignee: Nice Systems Ltd., Raanana (IL)

( * ) Notice: Subject to any disclaimer, the term of this patent is extended or adjusted under 35 U.S.C. 154(b) by 138 days.

(21) Appl. No.: 11/654,027

(22) Filed: Jan. 17, 2007

(65) Prior Publication Data

US 2008/0170621 A1    Jul. 17, 2008

(51) Int. Cl.
*H04N 7/18* (2006.01)
*G01R 31/08* (2006.01)
*H01H 31/10* (2006.01)

(52) U.S. Cl. ............... 348/143; 370/216; 307/115
(58) Field of Classification Search ............ 348/143; 370/216; 307/115
See application file for complete search history.

(56) References Cited

U.S. PATENT DOCUMENTS

| | | | | |
|---|---|---|---|---|
| 6,002,687 A | * | 12/1999 | Magee et al. | 370/394 |
| 6,665,004 B1 | * | 12/2003 | Paff | 348/156 |
| 7,269,836 B2 | * | 9/2007 | Nogima et al. | 725/32 |
| 2004/0103446 A1 | | 5/2004 | Yagi et al. | |
| 2005/0034157 A1 | | 2/2005 | Seo | |
| 2006/0018254 A1 | * | 1/2006 | Sanders et al. | 370/216 |

OTHER PUBLICATIONS

International Search Report for International Application No. PCT/IL07/00238. Date of Mailing Sep. 17, 2008.

* cited by examiner

*Primary Examiner*—Y. Lee
*Assistant Examiner*—Richard Torrente
(74) *Attorney, Agent, or Firm*—Pearl Cohen Zedek Latzer, LLP

(57) ABSTRACT

Device, system and method for encoding employing redundancy and switching are provided. For example, an encoder to convert analog data received from one or more video cameras into digital data for recording and possibly for live-monitoring is provided. The encoder may include an analog-to-digital converter and a redundancy unit capable of switching the analog data to a second encoder upon detecting a failure. The encoder may further include an internal matrix switcher to output the analog video data to a plurality of monitors for live monitoring.

15 Claims, 9 Drawing Sheets

DEVICE, SYSTEM AND METHOD FOR ENCODING EMPLOYING REDUNDANCY AND SWITCHING CAPABILITIES

BACKGROUND

Early closed circuit television (CCTV) surveillance systems provide analog architecture for both live-monitoring using a video matrix switcher and for recording capabilities using video cassette recordings (VCR's). Many analog surveillance systems are being replaced with either a complete digital architecture or modified to a hybrid architecture that enables using the existing analog cameras while gaining recording digital capabilities.

According to a first hybrid approach, analog video streams are received from the analog video cameras by an encoder that converts them to a digital format for delivery over the network. The network, which serves as a virtual switcher, delivers the video stream both for recording in digital format and for live monitoring. A major drawback of such a system is the lack of redundancy capabilities such that in an event of a failure in one of the encoders, video data is neither recorded nor live monitored until the failed encoder is replaced.

According to a second hybrid approach, which is used mainly when analog cabling infrastructure from the cameras to the monitors is already available, the digital system (using encoders) receives video signals for recording while the analog matrix switcher receives video signals directly from the cameras for live monitoring to reduce video latency caused by the network and to improve video quality and reliability. Still, the addition of analog matrices increases the complexity of the system and may cause other reliability problems. It would have been beneficial to decrease the number of elements in the system such that it may reduce the space taken by system and may increase the overall reliability of the system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
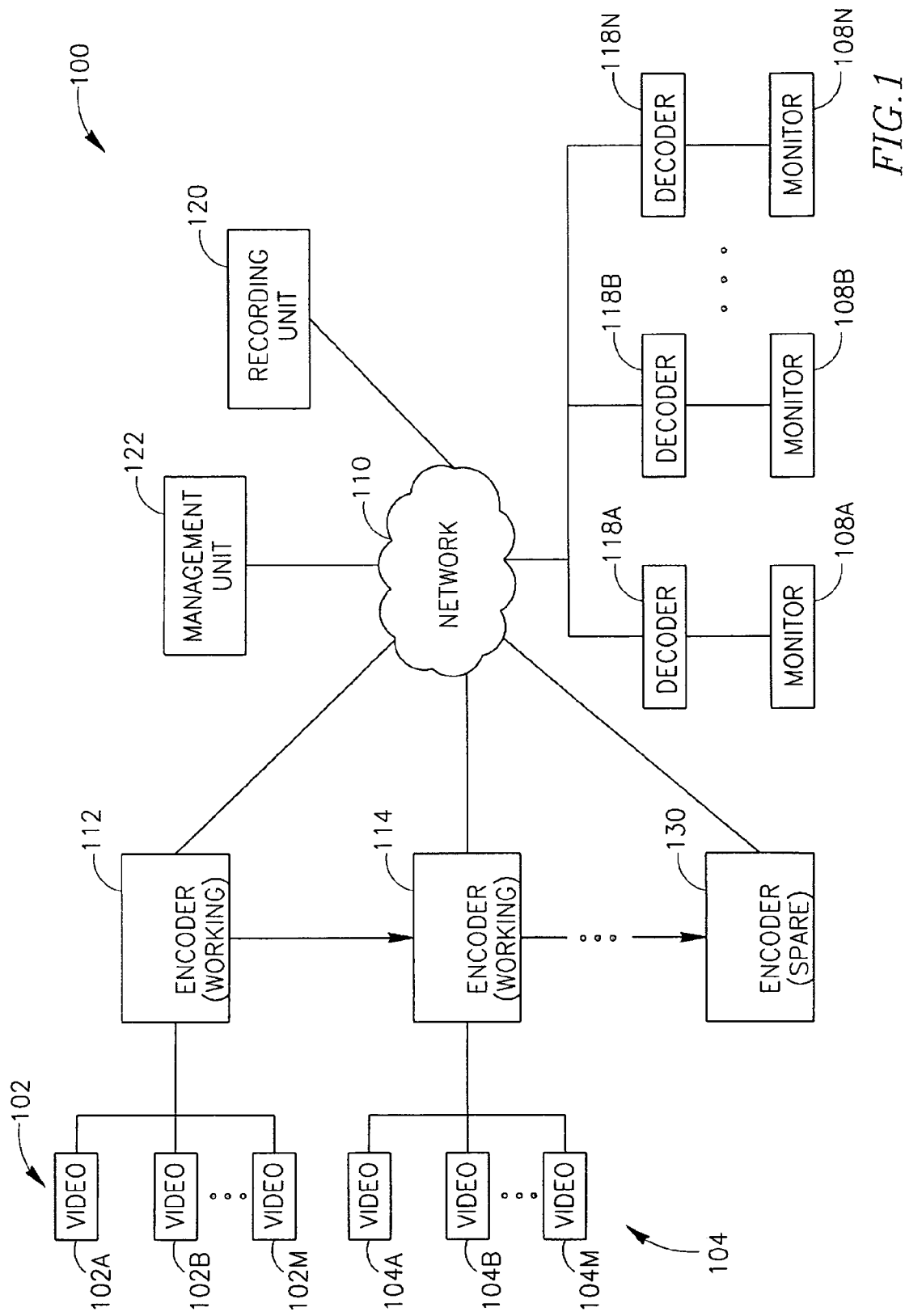
FIG. 1 is high-level block diagram of an exemplary CCTV monitoring system having encoders with redundancy capabilities according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention are directed systems involving analog input devices coupled to a packet-switched network. Accordingly, the analog signals generated analog devices need to be encoded for transmission over the network. Throughout the description below, for simplicity, the analog video devices are described as video cameras. It should, however be understood to a person skilled in the art that embodiments of the invention are not limited in this respect and other input devices such as audio input devices, a video graphic array (VGA) screen, a digital video interface (DVI) screen are likewise applicable.

Reference is now made to FIG. 1, which is a high-level block diagram of an exemplary video monitoring and recording system according to embodiments of the present invention. An exemplary monitoring and recording system 100 may comprise a plurality of analog video cameras arranged in one or more groups. For example, system 100 may include a first CCTV group 102 having a plurality of analog input devices, such as video cameras 102A, 102B . . . , and 102M. Cameras 102A-102M may be coupled to an encoder 112. Encoder 112 may receive a stream of analog video data from any of the cameras 102A-102M and may convert the analog data into digital video data. For example, system 100 may further include a second CCTV group 104 having a plurality of video cameras 104A, 104B . . . , and 104M. Cameras 104A-104M may be coupled to an encoder 114. Encoder 114 may receive a stream of analog video data from any of the cameras 104A-104M and may convert the analog data into digital video data.

Even though in the exemplary illustration of FIG. 1, video cameras are illustrated as the analog input devices, it should be understood to a person skilled in that the invention is not limited in this respect. According to embodiments of the present invention, other input device may be additionally or alternatively coupled to the encoders. For example, a plurality of audio devices may be coupled to a respective encoder with audio signals being the input signals. According to embodiments of the present invention, additionally or alternatively, system 10 may include screens, such as for example monitors 108 which may be coupled to a respective encoder as an input device with VGA or DVI signals being the input signals received by the encoders. Additionally or alternatively, according to embodiments of the invention control signals, such as, pan, tilt and zoom (PTZ) control signals may be input to the encoders to be delivers to the video cameras.

In the exemplary embodiment of FIG. 1, for simplicity, each group includes only 3 cameras. It should be understood, however, to a man skilled in the art that the each group may include any number of cameras (larger or smaller less than 3), for example each group of cameras may include 1, 8 or 16 cameras. Likewise, it should be understood to a man skilled in the art that the monitoring system may include any number of groups of cameras and corresponding encoders.

Encoders 112 and 114 may be coupled a network 110 for delivering the digital video data for storage or for live-monitoring. Network 110 may be a Local Area Network (LAN), a Wireless LAN (WLAN), a Metropolitan Area Network (MAN), a Wireless MAN (WMAN), a Wide Area Network (WAN), a Wireless WAN (WWAN) and networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards. By way of example, a network 110 may facilitate an exchange of information packets in accordance with the Ethernet local area networks (LANs). Such Ethernet LANs conform to the IEEE 802.3, 802.3u and 802.3x network standards, published by the Institute of Electrical and Electronics Engineers (IEEE).

The digital video data originated from analog video data from any of the analog video cameras may be delivered over network 110 to a recording unit 120. Recording unit 120 may include any suitable digital storage known in the art such as for example, magnetic hard disks, DVD, a redundant array of independent disks (RAID) and the like. According to embodiments of the invention, system 100 may further comprise a management unit 122 which may control the cameras, the encoders and the recording unit. According to embodiments of the present invention, control signals, such as pan, tilt and zoom (PTZ) control signals may be delivered via the encoders from management unit 122 to the cameras.

System 100 may further comprise a plurality of monitors 108A-108N for live-monitoring of video data streams received from any of cameras 102A-102M and 104A-104M. The monitors may be coupled to network 110 via respective decoders 118A-118N to enable to enable the retrieval of digital video data stored in recording unit 120 for off-line viewing. It should be understood to a person skilled in the art that any monitor 108A-108N may be capable of receiving video data from any one of the cameras 102A-102M and 104A-104M as network 110 serves as a virtual switcher. In the exemplary embodiment of FIG. 1, for simplicity, each only 3 monitors are illustrated. It should be understood, however, to a man skilled in the art that the number of the monitors may vary and may be, for example there may be 32 or 64 monitors.

According to embodiments of the present invention, system 100 may further include a spare encoder 130, which may be coupled to network 110. Encoders 112, 114 and spare encoder 130 may be connected together to form a chain, with the spare being the last in the chain. During normal operation, encoders 112, 114, designated as working encoders, may receive video data streams, each from its corresponding group of cameras, cameras 102A-102M and 104A-104M and may convert the analog data stream into digital format for recording or live monitoring. When one of encoders 112, 114 fails, the video data streams received from the group of cameras coupled to the failed encoder may be switched to spare encoder 130 and the spare encoder may immediately and automatically switch to a normal working mode of operation as explained in detail below with respect to FIG. 3.

Figure 2:
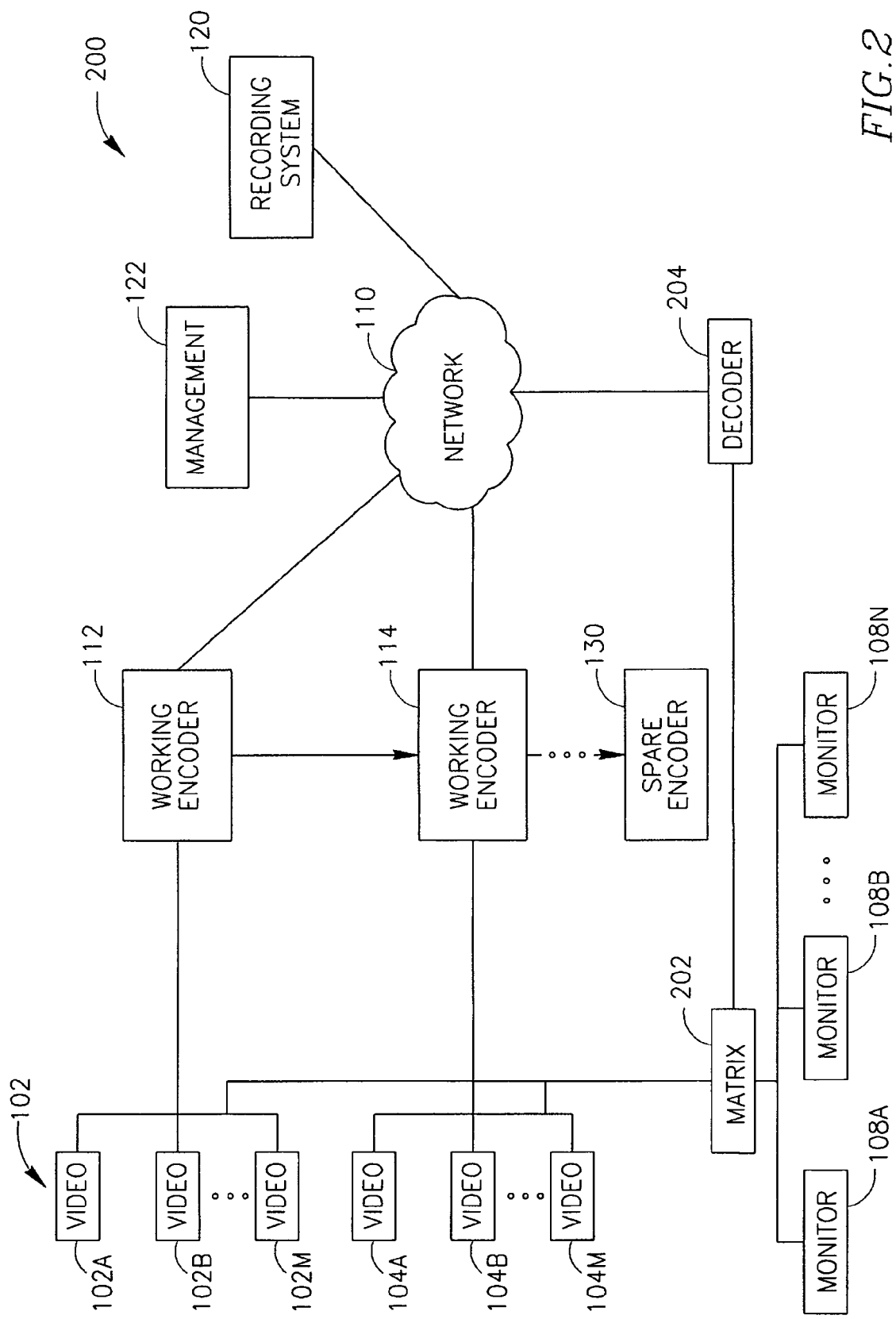
FIG. 2 is high-level block diagram of an exemplary CCTV monitoring system having encoders with redundancy capabilities according to embodiments of the present invention.

Reference is now made to FIG. 2 which is a high-level block diagram of another exemplary monitoring and recording system according to embodiments of the present invention. The principal difference between embodiments represented by the system 100 in FIG. 1 as opposed to system 200 in FIG. 2 is the introduction of a conventional video matrix 202 which may be used to switch the various analog video streams received directly from cameras 102A-102M and 104A-104M to any one of monitors 108A-108N. Video matrix 202 may be coupled to network 110 via a decoder 204 to enable the retrieval of digital video data stored in recording unit 120 for off-line viewing by a user at monitors 108A-108N.

Figure 3:
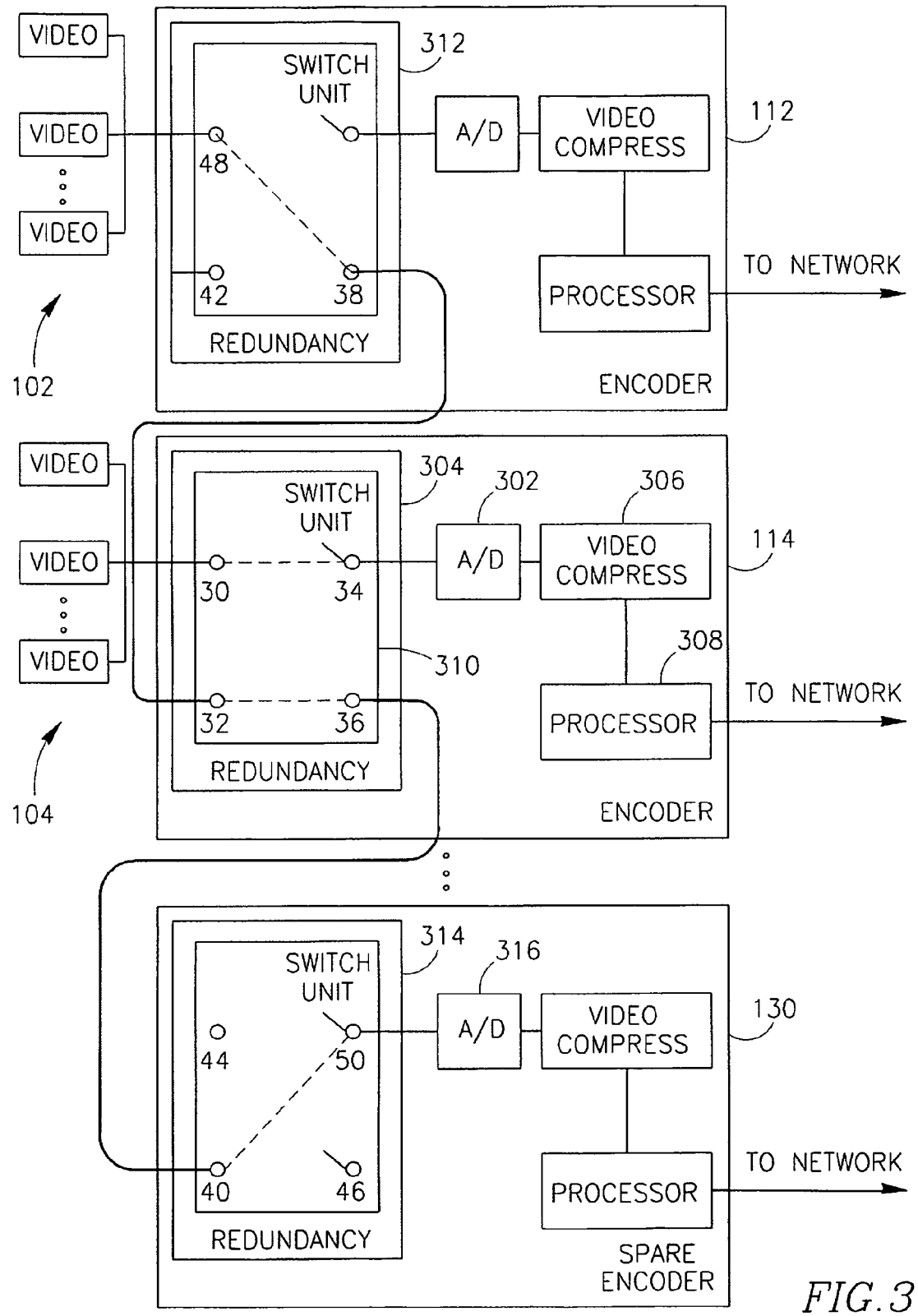
FIG. 3 is high-level block diagram of exemplary encoders with redundancy capabilities and analog matrix for live-monitoring according to embodiments of the present invention.

A detailed description of encoders 112, 114 and spare encoder 130 will now be provided with respect to FIG. 3. Even though, for simplicity, only 3 encoders are illustrated, it should be understood to a person skilled in the art that the embodiments of the invention are not limited in this respect and any number of encoders may be connected in an "open chain" fashion to one another, the spare encoder being the last encoder in the chain. According to embodiments of the present invention, encoder 114, for example, may generally include an Analog-to-Digital (A/D) converter 302 coupled to a redundancy unit 304. Encoder 114 may further comprise a video compression unit 306 coupled to A/D converter 302 and a processor 308 coupled to compression unit 306, redundancy unit 304 and network 110. Processor 308 may provide overall control over encoder 114.

According to some embodiments of the present invention processor 308 may be a general-purpose processor. Additionally or alternatively, processor 308 may include a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller.

In some embodiments of the invention, redundancy unit 304 may include switch unit 310 having a pair of linked switches. Switch unit 310 may comprise two input nodes 30 and 32 and two output nodes 34 and 36. Input node 30, designated internal input node, may be coupled to group of video cameras 104 via an analog video bus capable of carrying M composite video signals. Input node 32, designated external input node, may be coupled to the external output node of encoder 112, designated output node 38 via an analog video bus capable of carrying M composite video signals. Output node 34, designated internal output node, may be coupled to A/D 302 via an analog video bus capable of carrying M composite video signals. Output node 36, designated external output node, may be coupled to the external input node of spare encoder 130, designated output node 40 via an analog video bus capable of carrying M composite video signals. Although only 3 encoders are shown in the exemplary illustration of FIG. 3, it should be understood to a person skilled in the art that when more that 3 encoders are included in the system, for two successive working encoders, the external output node of a first working encoder may be coupled to the external input node of the second working encoder.

According to embodiments of the present invention, external input node 42 of encoder 112, which is the first encoder in the chain of encoders, may be uncoupled. Likewise, internal input node 44 and external input node 46 of spare encoder 130, which is the last encoder in the chain of encoders, may be uncoupled.

The redundancy units may have three modes of operation, namely, normal mode, failure mode and redundant mode. As illustrated with respect to redundancy unit 304, in the normal mode, internal input node 30 and internal output node 34 are connected such that analog video streams from the group of analog cameras 104 are switched directly to A/D converter 302. In the normal mode, external input node 32 and external output node 36 are connected to enable switching of analog video signals from the group of analog cameras 102 to spare unit 130 in an event of a failure at encoder 112.

As can be seen at redundancy unit 312, in the failure mode, internal input node 48 and external output node 38 are connected such that analog video signals from the group of analog cameras 102 are switched via redundancy unit 304 to A/D converter 316 of spare encoder 130. As can be seen at redundancy unit 314, in the redundant mode, external input node 40 and internal output node 50 are connected such that analog video signals received from the analog cameras associated with a failed encoder are switched to A/D converter 316.

During normal operation, for a set of M+1 video encoders chained together, all the redundancy units of the first M encoders, such as for example, redundancy unit 312 of encoders 112 and redundancy unit 304 of 114 operate at normal mode with redundancy unit 314 of spare encoder 130 operates at redundant mode.

In an event of a failure detected with respect to one of the working encoders, the failed encoder, for example, encoder 112 may automatically switch to failure mode. In this mode, video analog signals received from the group of cameras 102 may be redirected via external output node 38 to internal input node 32 of encoder 114 and from there the signals may be redirected via external output node 36 to external input node of the next encoder in the chain (not shown) while continuing transmitting analog videos received from the group of cameras 104 to it's A/D converter 302. The video analog signals received from the group of cameras 102 may be further redirected via all the encoders in the chain to external input node 40 of spare encoder 130 and from node 40 via internal output node 50 to A/D converter 316 for processing. Once the failed encoder is fixed or replaced, all the encoders are in normal mode and video signals would not be redirected to the spare encoder.

According to embodiments of the present invention, the redundancy unit may be triggered when a failure within the encoder is detected by a watchdog circuitry (not shown) that triggers switch unit 310. The watchdog circuitry may be embedded within processor 308 or as a dedicated circuitry. The failure may be related to any sub unit of the encoder, such as for example, processor 308, the operating system, application software and the like.

The redundancy unit may be triggered when a failure of hardware components and DSP's associated for example with A/D converter 302 and video compression unit 306 is detected by processor 307, which in turn instructs the switch to change its mode. Additionally, in an event of power failure, the switch may automatically be switched to a failure mode to enable forwarding the received input signals to the spare encoder.

Figure 4:
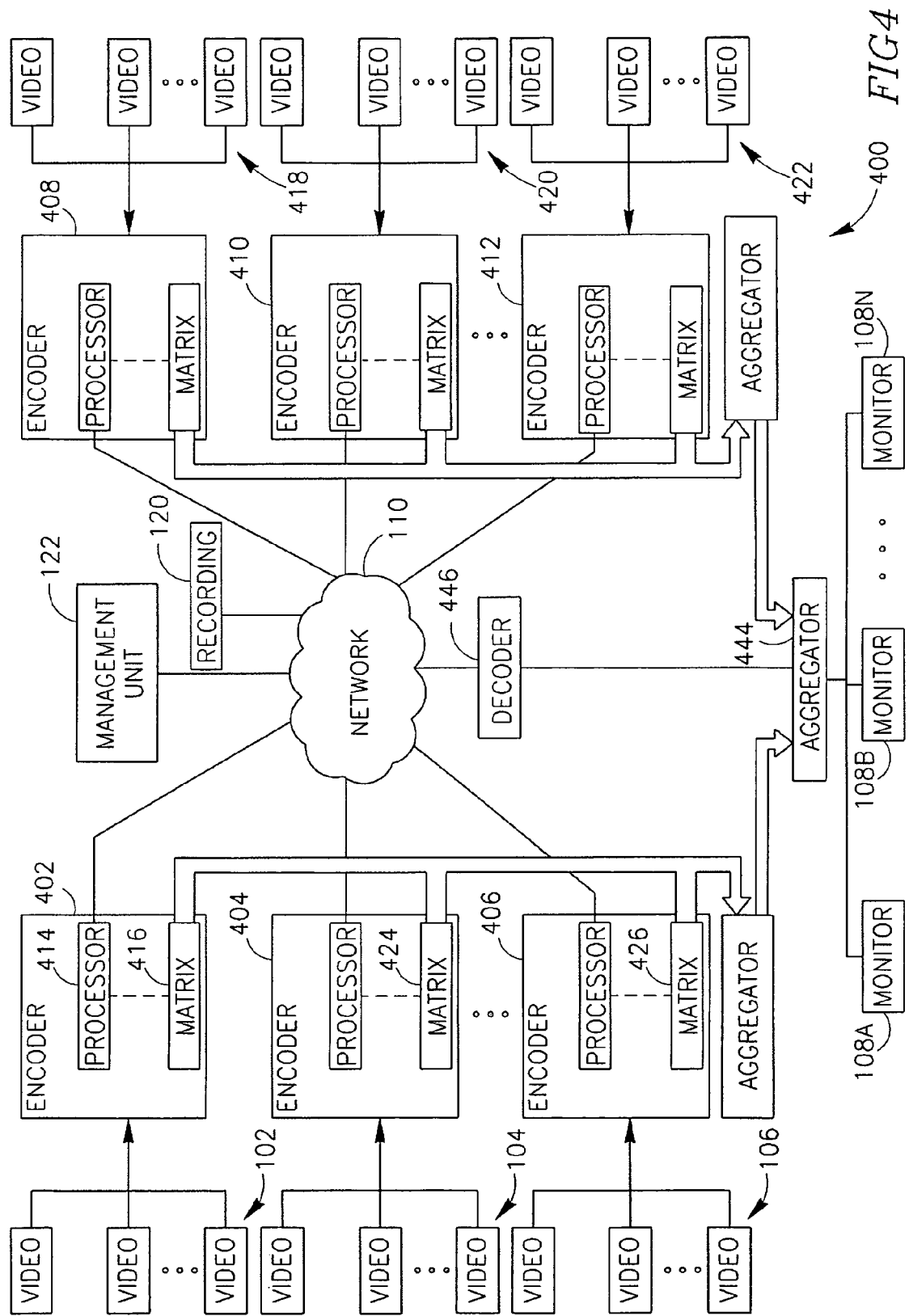
FIG. 4 is high-level block diagram of an exemplary CCTV monitoring and recording system having encoders with matrix switching capabilities according to embodiments of the present invention.

Reference is now made to FIG. 4, which is a high-level block diagram of an exemplary CCTV monitoring and recording system having encoders with matrix switching capabilities according to embodiments of the present invention. According to embodiments of the invention, the encoders, for example encoders 402 and 404 may pass both digital and analog data. Digital data may be passed via the network for recording unit, while analog video data may be passed via internal matrix switchers for live monitoring. Elements of the system of FIG. 4, which were previously described in relation to FIG. 1 were designated like numerals and will not be described in detail inhere.

An exemplary system 400, depicted in FIG. 4, may enable routing of the analog video data from any of the analog video cameras directly to monitors 108A-108N for live-monitoring using video matrix switchers embedded within the encoders.

For example, system 400 may include an encoder 402 coupled to the first group of M video cameras 102A-102M, an encoder 404 coupled to the second group of M video cameras 104A-104M and an encoder 406 coupled to a third group of M video cameras 106A-106M. System 400 may further include encoders 408, 410 and 412, each of which coupled to a respective group of analog video cameras, 418, 420 and 422.

Figure 5:
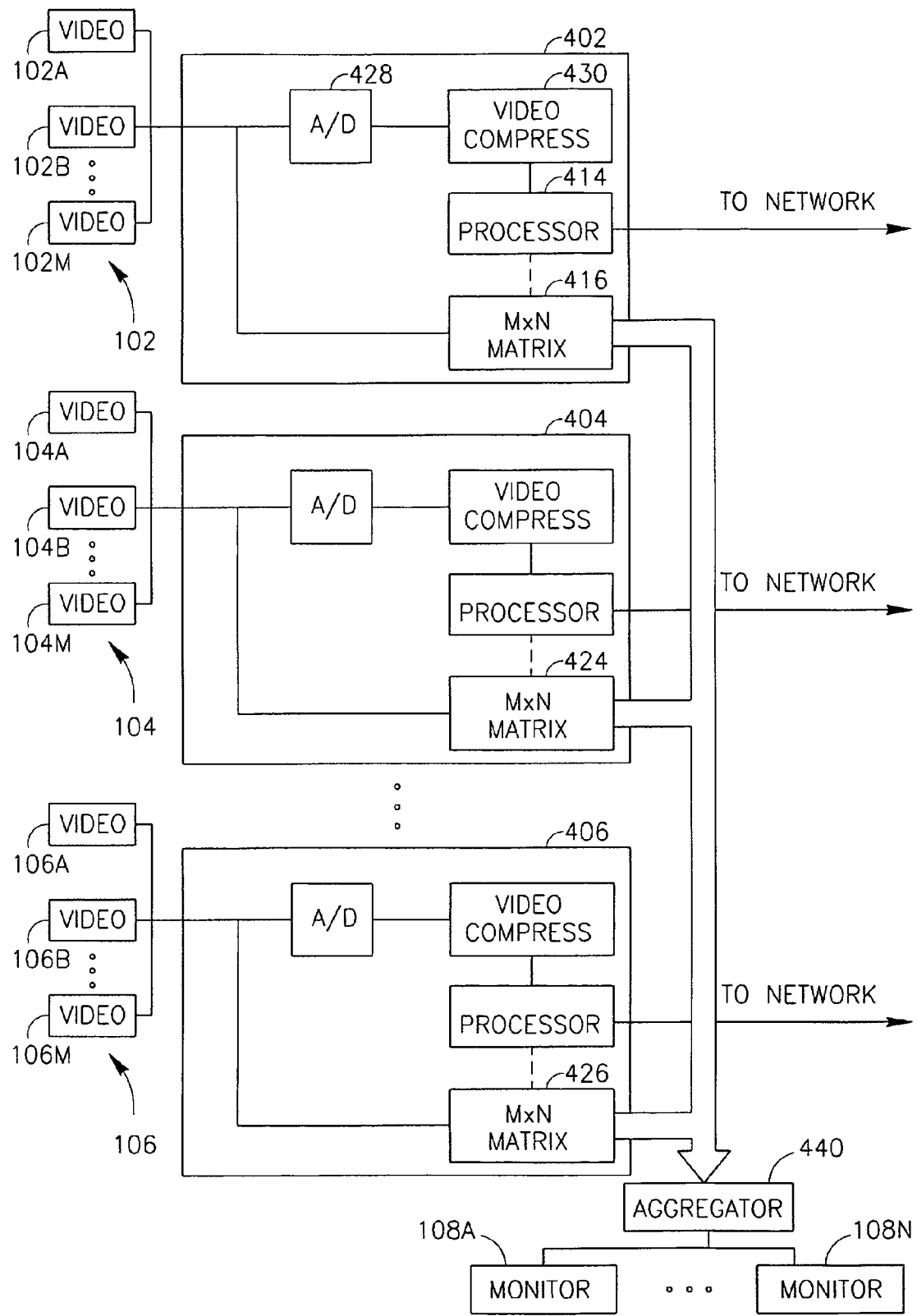
FIG. 5 is high-level block diagram of exemplary encoders with matrix switching capabilities according to embodiments of the present invention.

A detailed description of encoders 402, 404 and 406 will now be provided with respect to FIG. 5. Although, for simplicity, only 3 encoders are illustrated, it should be understood to a person skilled in the art that the embodiments of the invention are not limited in this respect and any number of encoders may be connected in an "open chain" fashion to one another, the spare encoder being the last encoder in the chain. Encoder 402, for example may include an A/D converter 428 to receive video data signals from its corresponding group of cameras 102 and to convert the analog data into digital data. Encoder 402 may further include a video compression module 430 to receive the digital data from A/D converter 428 and to compress it using any video compression algorithm, as known in the art. Encoder 402 may further include a processor 414 to receive the compressed video stream, which is a combined stream which may contain data from one or more of cameras 102A-102M and to output the digital compressed data over network 110 to recording unit 120.

In some CCTV monitoring and recording systems the number video cameras being the input channels may be several thousands whereas the number of monitors being the output channels is usually much smaller (in the order of several dozens). According to embodiments of the present invention, encoders with internal matrix capabilities coupled in a distributed matrix scheme that may include one or more aggregators are provided to enable analog video signals received from any analog video camera coupled to any of the encoders to be delivered to any one of the monitors. According to embodiments of the present invention, encoder 402 may include an internal matrix switcher 416. Matrix switcher 416 may be an M*N matrix where M is the number of cameras coupled to encoder 402, namely the number of input channels of matrix switcher 416 and N is the number of output channels of matrix switcher 416. Matrix switcher 416 may be coupled to processor 414 and may be controlled by a user via processor 414. It should be understood to a person skilled in the art that encoders 404, 406, 408, 410 and 412 have similar architecture and functionality.

Accordingly, encoder 404 may include an internal matrix switcher 424 and encoder 406 may include an internal switcher 426. Matrix switcher 424 may be an M*N matrix where M is the number of cameras coupled to encoder 404, namely the number of input channels of matrix switcher 424 and N is the number of output channels of matrix switcher 424. Matrix switcher 426 may be an M*N matrix where M is the number of cameras coupled to encoder 406, namely the number of input channels of matrix switcher 426 and N is the number of output channels of matrix switcher 426. According to embodiments of the present invention, the number of input cameras coupled to an encoder M may differ such that for example the number of cameras coupled to a first encoder may be M1 while the number of cameras coupled to a second encoder may be M2.

System 400 may further include an aggregator 440 coupled to matrix switchers of encoders 402, 404 and 406 and a similar aggregator 442 coupled to matrix switchers of encoders 408, 410 and 412. Aggregator 440, for example may be a passive device that may aggregate a number of P encoders such that analog video signals received from any analog video camera coupled to any of the encoders may be delivered via one of N output channel of aggregator 440 to any one of N monitors, for example, monitors 108A-108N. For example, in aggregator 440, all the output channels (3*N) of the matrix switchers 416, 424 and 426 are connected together. In general, according to embodiments of the present invention, by connecting P encoders to aggregator 440, a switching capabilities of (M*P) input channels to N output channels may be enabled, wherein M is the number of analog video cameras coupled to each encoder.

Figure 6A:
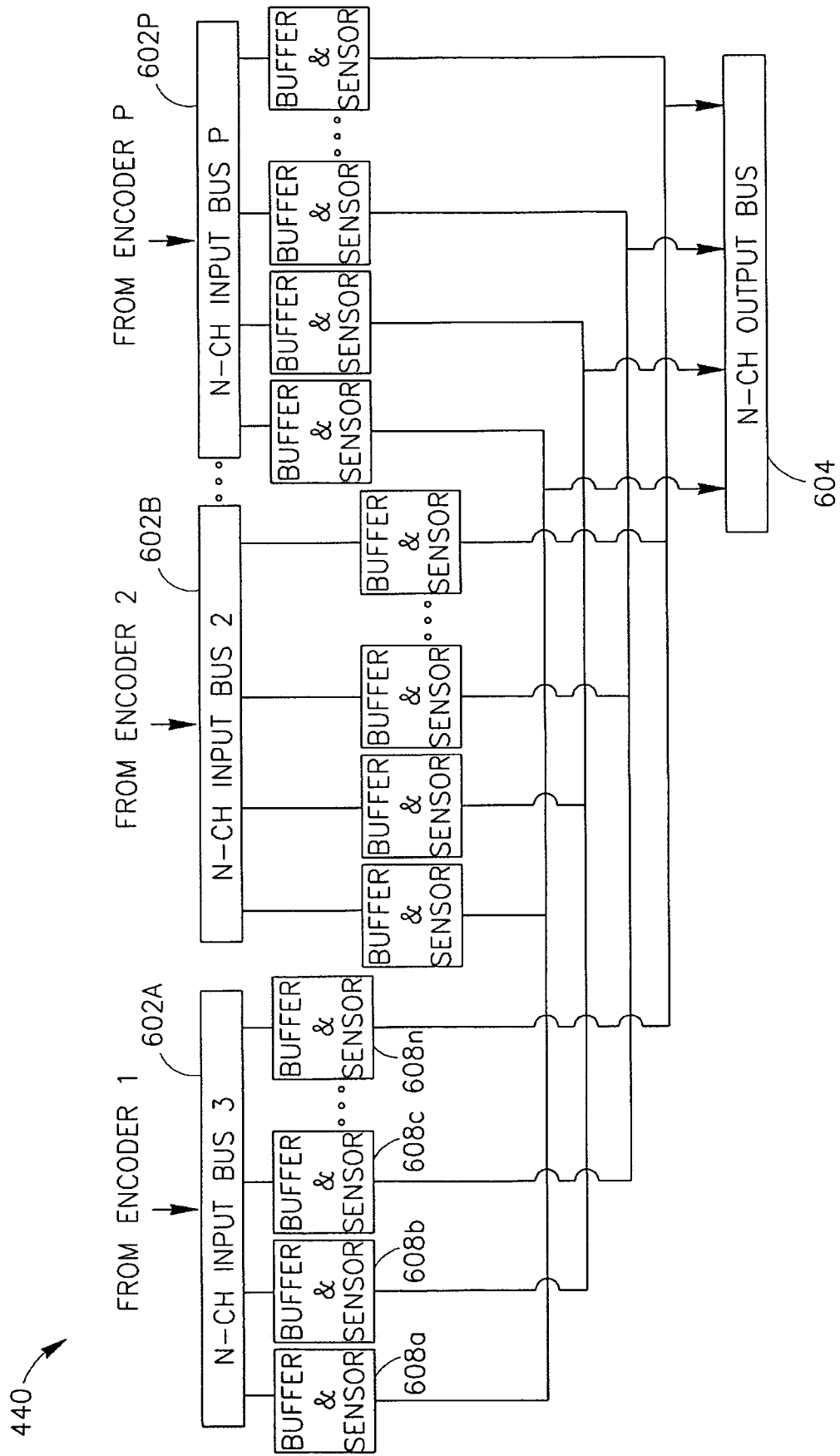
FIG. 6A is high-level block diagram of an exemplary aggregation unit according to embodiments of the present invention.

As shown in FIG. 6A, aggregator 440, for example, may comprise a plurality of N-channel input buses 602A-602P to receive input analog signals from respective encoders and a single N-channel output bus 604. Although, for simplicity, only 3 N-channel input buses are illustrated, it should be understood to a person skilled in the art that the embodiments of the invention are not limited in this respect and aggregator 440 may include more or less N-channel input buses. According to embodiments of the invention, P the number of N-channel input buses may be any number and according to other embodiments P may be equal to N the number of channel on a bus.

The number of encoders coupled to aggregator 440 may be determined based on the number of N-channel input buses. Each input channel on bus 602A is coupled to a respective channel buffer 608a-608n and to a respective sensor. According to embodiments of the present invention, the aggregator may include P groups of input channel arranged in the following scheme. Each group of input channels may include N input channels such that each channel within a group is coupled to a different N-channel input bus 602. The input channels within each group are connected together such that only one of the input channels within a group can transmit signals to N-channel output bus 604. According to embodiments of the present invention only one input channel within group of connected channel may carry a signal to the associated output channel within N-channel output bus 604. The sensor and buffer, referred to as box unit 608, that are associated with the other input channels in the group may guarantee that these channels would stay in tri-mode state when there is no valid signal on those channels.

According to embodiments of the present invention, management unit 122 may be responsible for controlling system 400 such that only one input channel within a group may carry a valid signal to N-channel output bus 604 at a time. According to an exemplary implementation, management unit 122 may control matrix switchers 416, 424 and 426 to ensure that at a given time only one of encoders 402, 404 and 406 may switch a particular one of its M input channels to a particular one of the N output channel on aggregator 440.

The switching capabilities of exemplary system 400 of FIG. 4 may be further increased by aggregating output channel of aggregator 440 and output channels of aggregator 442 within aggregator 444. Additionally, aggregator 444 may be coupled to network 110 via a decoder 446 to enable retrieval of digital video data stored in recording unit 120 to monitors 108 for off-line viewing. Even though, in the exemplary illustration of FIG. 4, decoder 446 is coupled only to aggregator, 444, it should be understood to a person skilled in the art that embodiments of the invention are not limited in this respect and there may be other architectures for receiving signals by the monitors.

For example, alternatively or additionally, one or more monitors 108 may be coupled via respective decoders (not shown) for receiving video signals from recording unit 120 via network 120. According to other embodiments of the present invention, decoder 446 may include an analog video input to receive video signals from aggregator 444 to be delivered to monitors 108. According to these embodiments, the decoder may add on screen capabilities (OSD) in addition to transmitting the analog video signals received from aggregator 444 to monitors 108. Such architecture may enable viewing concurrently live video signals and recorded video signals on the same monitor. According to embodiments of the present invention, the architecture may enable switching using a management SW between viewing live video and recorded video on the same monitor.

It should be understood that even though in the exemplary illustration of FIG. 4 only two aggregators 440 and 442 are depicted, the number of aggregators is not limited to two and aggregator 444 may aggregate output channels from P aggregators, where P may be, for example, 8 or 16. In general, according to embodiments of the present invention, by connecting P aggregators to aggregator 444, a switching capabilities of (M*P*P) input channels to N output channels may be enabled, wherein M is the number of analog video cameras coupled to each encoder.

Figure 6B:
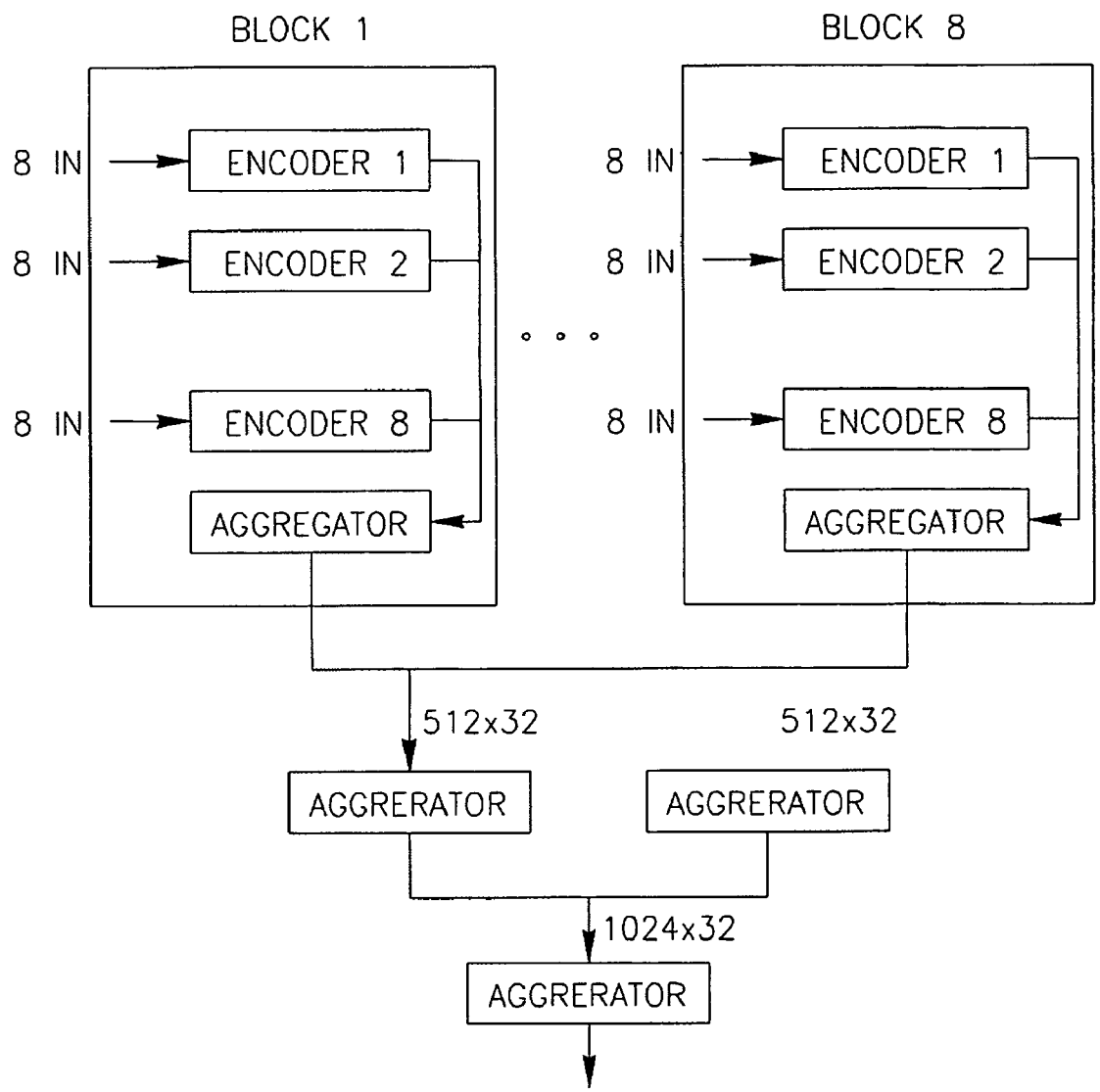
FIG. 6B is high-level block diagram of an exemplary aggregation structure according to embodiments of the present invention.

As illustrated at FIG. 6B which shows an exemplary distributed scheme of matrix switching capabilities, according to embodiments of the present invention, the system may be scalable to additional input channels by the addition of further aggregators as may be needed. Each of the eight blocks at the top contains eight video encoders, each of which may have eight video inputs. Thus each block may receive up to 512 video inputs. As shown, there may be eight of these blocks feeding each of a pair of aggregators, both of which may have 32 possible output channels. When these two aggregators are combined at the bottom-most aggregator in the figure, the result is a matrix 1024×32: 1024 video inputs versus 32 output channels.

Figure 7:
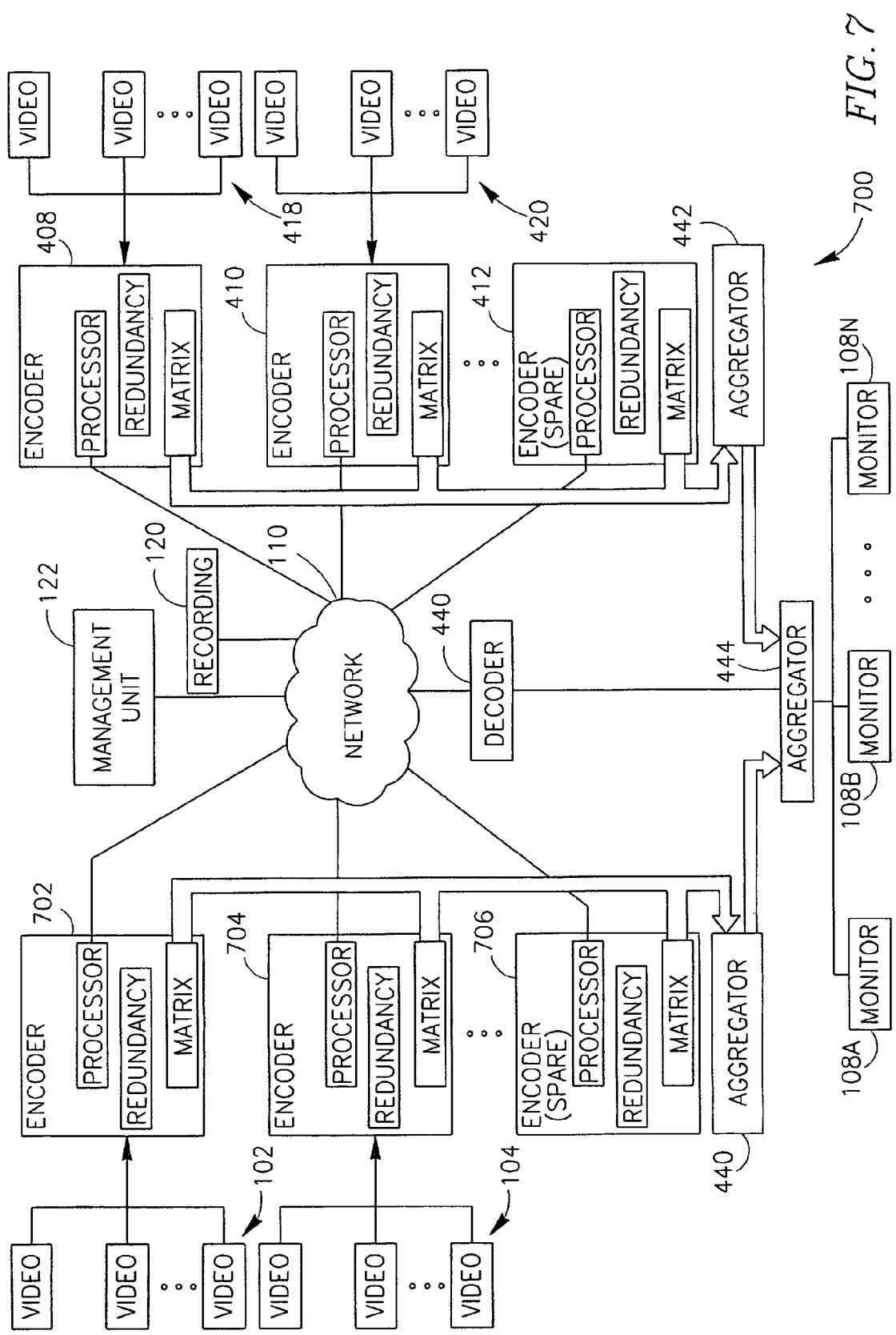
FIG. 7 is high-level block diagram of an exemplary CCTV monitoring and recording system having encoders with matrix switching and redundancy capabilities according to embodiments of the present invention.

Reference is now made to FIG. 7, which is a high-level block diagram of an exemplary CCTV monitoring and recording system having encoders with both matrix switching and redundancy capabilities according to embodiments of the present invention. Elements of the system of FIG. 7, which were previously described in relation to FIGS. 1 and 4 were designated like numerals and will not be described in detail inhere.

For example, system 700 may include an encoder 702 coupled to the first group of M video cameras 102A-102M, an encoder 704 coupled to the second group of M video cameras 104A-104M and a spare encoder 706. Encoders 702, 704 and spare encoder 706 may be connected together to form a chain, with the spare being the last in the chain. System 700 may further include encoders 708, 710, each of which being coupled to a respective group of analog video cameras, 418, 420 and a spare encoder 712. Encoders 708, 710 and spare encoder 712 may be connected together to form a chain, with the spare being the last in the chain.

During normal operation, encoders 702 and 704, designated as working encoders, may receive video data signals, each from its corresponding group of cameras, groups 102 and 104 and may convert the analog data signal into digital format for recording or live monitoring. When one of encoders 702 or 704 fails, the video data signals received from the group of cameras coupled to the failed encoder may be switched to spare encoder 706 and the spare encoder may immediately and automatically switch to a normal working mode of operation as explained in detail above with respect to FIG. 3. Accordingly, in case of a failure in one of the working encoders, the analog signals received by a redundancy unit 802 of spare encoder 706 may be transmitted to A/D converter 804 to be converted to digital signals suitable for being transmitted via network 100 to be recorded by recording unit 120. Additionally, the analog signals received by redundancy unit may be routed to matrix switcher 806 for live monitoring.

Figure 8:
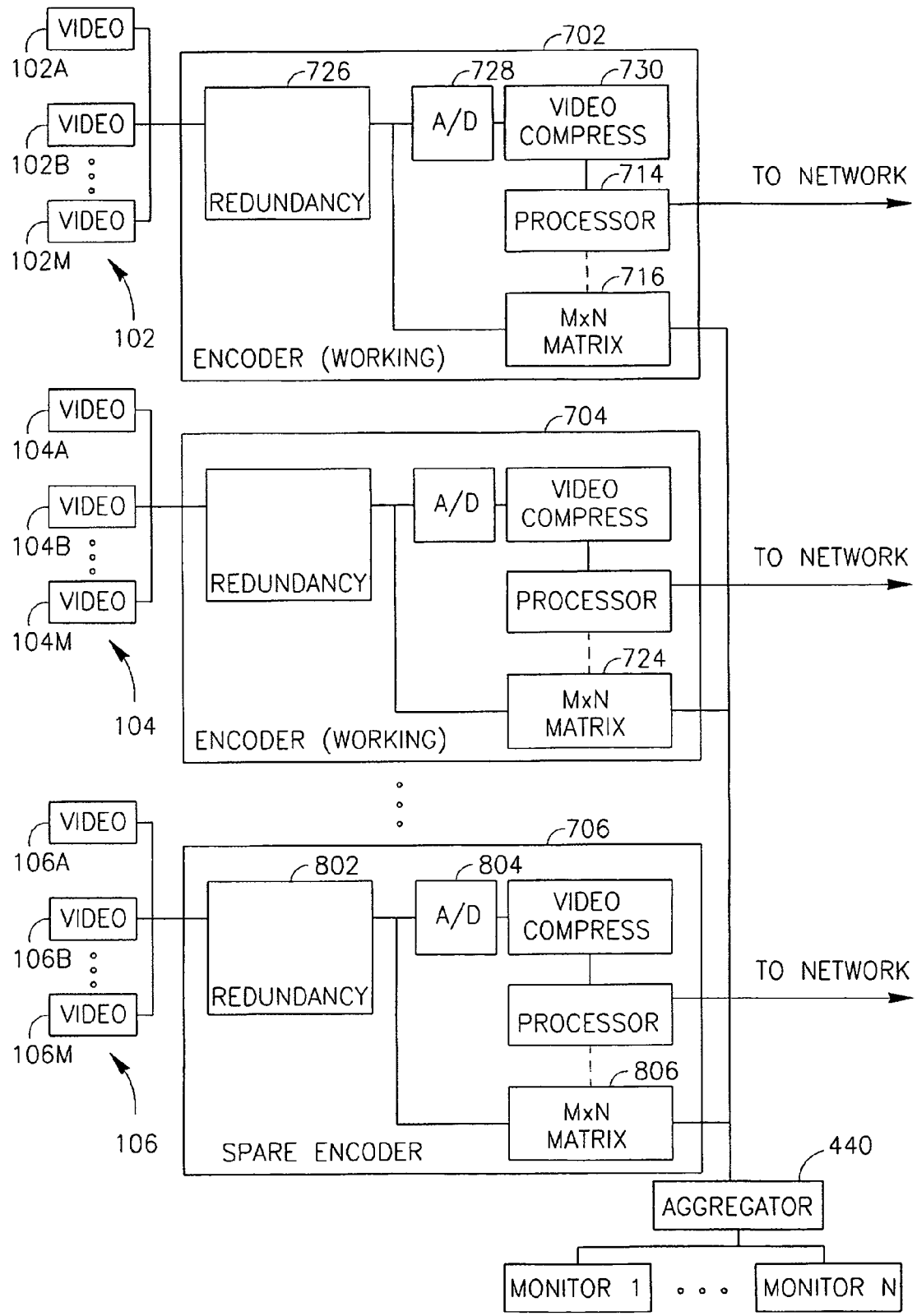
FIG. 8 is high-level block diagram of exemplary encoders with matrix switching and redundancy capabilities according to embodiments of the present invention.

A detailed description of encoders 702, 704 and 706 will now be provided with respect to FIG. 8. Even though, for simplicity, only 3 encoders are illustrated, it should be understood to a person skilled in the art that the embodiments of the invention are not limited in this respect and any number of encoders may be connected in an "open chain" fashion to one another, the spare encoder being the last encoder in the chain. Encoder 702, for example may include an A/D converter 728 to receive video data signals from its corresponding group of cameras 102 and to convert the analog data into digital data. Encoder 702 may further include a video compression module 730 to receive the digital data from A/D converter 728 and to compress it using any video compression algorithm, as known in the art. Encoder 702 may further include a processor 714 to receive the compressed video stream, which is a combined stream which may contain data from one or more of cameras 102A-102M and to output the digital compressed data over network 110 to recording unit 120.

According to embodiments of the present invention, encoder 702 may include an internal matrix switcher 716. Matrix switcher 716 may be an M*N matrix where M is the number of cameras coupled to encoder 702, namely the number of input channels of matrix switcher 710 and N is the number of output channels of matrix switcher 710. Matrix switcher 716 may be coupled to processor 714 and may be controlled by a user via processor 714.

It should be understood to a person skilled in the art that encoders 704, 706, 408, 410 and 412 have similar architecture and functionality. Accordingly, encoder 704 may include an internal matrix switcher 724 and encoder 706 may include an internal switcher 726. Matrix switcher 724 may be an M*N matrix where M is the number of cameras coupled to encoder 704, namely the number of input channels of matrix switcher 724 and N is the number of output channels of matrix switcher 724. Matrix switcher 726 may be an M*N matrix where M is the number of cameras coupled to encoder 706, namely the number of input channels of matrix switcher 726 and N is the number of output channels of matrix switcher 726.

Matrix switchers 716, 724 of the working encoders and matrix switch 726 of the spare encoder are all coupled to aggregator 440 and the matrix switching structure of system 700 is in general similar to the aggregation structure which was described in detail above with respect to FIGS. 4-6. It should be understood to a person skilled in the art that in the aggregation structure of system 700, according to embodiments of the present invention, by connecting P encoders including the spare encoder to aggregator 440, a switching capabilities of M*(P−1) input channels to N output channels may be enabled, wherein M is the number of analog video cameras coupled to each encoder.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An encoder to convert analog data received from one or more video cameras into digital data, the encoder connectable in a chain structure of three or more encoders serially connected to each other, the encoder comprising:
   an analog-to-digital converter;
   an internal redundancy unit coupled to the analog-to-digital converter and to another internal redundancy unit of a subsequent encoder in the chain structure, wherein the internal redundancy unit is to receive the analog data, to switch the analog data to the redundancy unit of the second encoder upon detecting a failure and to switch the analog data to the analog-to-digital converter if no failure is detected.

2. The encoder of claim 1, wherein said encoder is able to convert analog audio into digital signals.

3. The encoder of claim 1, wherein the redundancy unit comprises:
   a switching unit capable of routing the data received to the analog-to-digital converter or to a spare encoder.

4. The encoder of claim 1, wherein the internal redundancy unit comprises:
   a first input node to receive the analog data from one of said cameras;
   a second input node coupled to a previous encoder in the chain structure;
   a first output node coupled to said analog-to-digital converter; and
   a second output node coupled to the subsequent encoder in the chain structure.

5. The encoder of claim 1 further comprising:
   a video compression unit coupled to said converter.

6. The encoder of claim 1 further comprising:
   a video matrix switcher to output said analog video data to a plurality of monitors.

7. A system comprising:
   two or more working encoders coupled to a communication network, each having a respective internal redundancy unit, each of the encoders being coupled to a respective group of one or more analog video cameras; and
   a spare encoder coupled to the communication network and the working encoders, wherein the two or more working encoders are serially connected to each other in a chain structure and the chain structure is serially connected to the spare encoder such that transmission of analog data from a previous working encoder in the chain structure through one or more subsequent working encoders in the chain to the spare encoder is enabled, wherein when one of the working encoders becomes a failed encoder, analog data received by the failed encoder is routed by the internal redundancy unit of the failed encoder through one or more internal redundancy units of the one or more subsequent working encoders in the chain to the spare encoder.

8. The system of claim 7, wherein when the analog data received by the failed encoder is routed to the spare encoder, the spare encoder automatically switches to a working mode of operation.

9. The system of claim 7 comprising:
a recording unit coupled to said encoders via a packet-switched network.

10. The system of claim 7, wherein each of the encoders comprises a respective one of analog matrix switchers to output analog data received from the group of cameras coupled to said encoder.

11. The system of claim 10 comprising:
an aggregator coupled to said analog matrix switchers to receive from said switchers analog data associated with any of said groups of video cameras and to output said analog data to a plurality of analog displays in real-time.

12. A method comprising:
receiving, by a particular one of two or more working encoders from one or more video cameras, analog input data to be converted into digital input, wherein the working encoders are serially connected to each other in a chain structure and the chain structure is serially connected to a snare encoder and each of the working encoders comprises a respecting internal redundancy unit;
delivering the analog data from the respective internal redundancy unit of the particular working encoder through one or more respective redundancy units of one or more subsequent working encoders in the chain to the spare encoder upon detection of a failure of the particular working encoder; and
delivering the analog data from the respective internal redundancy unit of the particular working encoder to a respective analog-to-digital converter if failure is not detected.

13. The method of claim 12, wherein delivering the analog data comprises switching the analog data to the spare encoder that automatically switches to a working mode of operation.

14. The method of claim 12 comprising:
directing the analog input data within a single housing to an analog-to-digital converter and to an analog matrix switcher to be outputted as analog signals.

15. The method of claim 12 comprising:
converting said analog input data to digital signals; and
recording said digital signals.

* * * * *